Oct. 18, 1966     A. M. HELMINTOLLER     3,279,182
THRUST REVERSER
Filed June 7, 1965                                             2 Sheets-Sheet 1
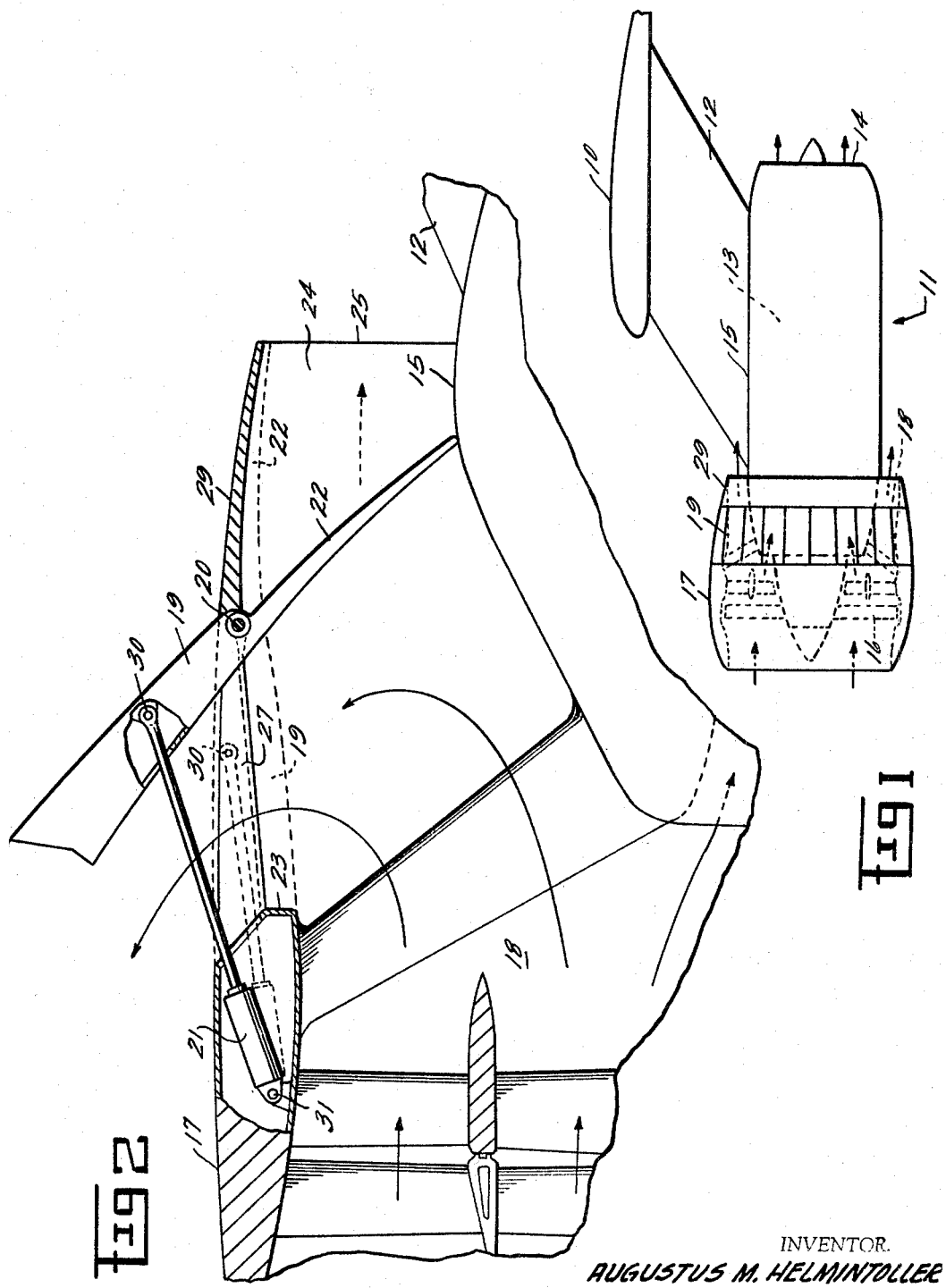
INVENTOR.
AUGUSTUS M. HELMINTOLLER
BY
John F. Cullen
ATTORNEY.

Oct. 18, 1966  A. M. HELMINTOLLER  3,279,182
THRUST REVERSER
Filed June 7, 1965  2 Sheets-Sheet 2
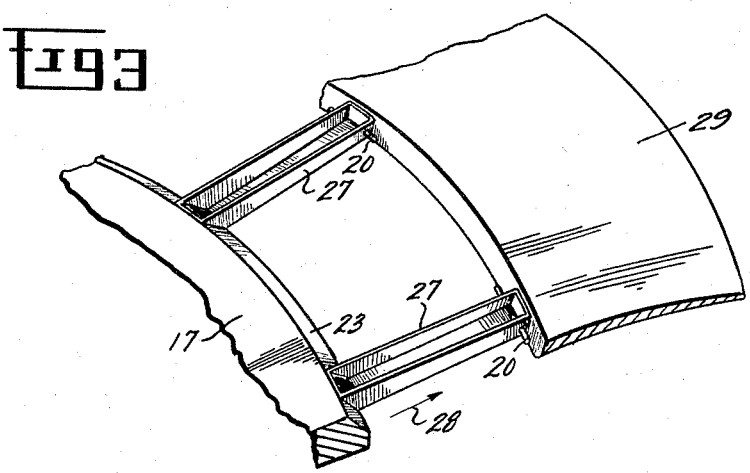
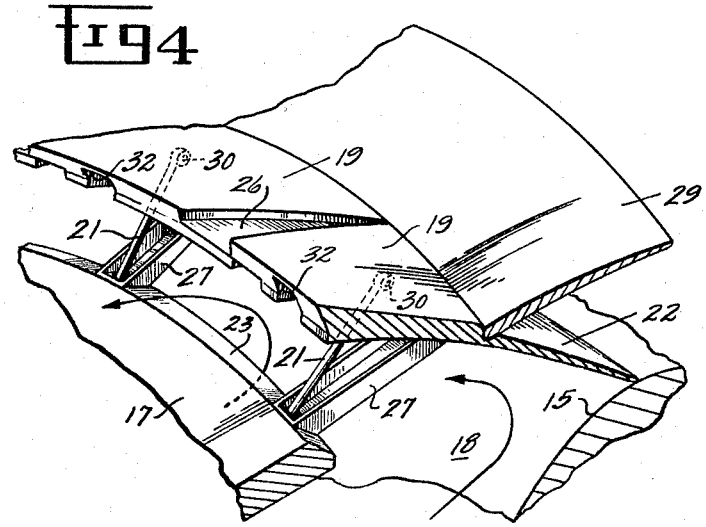
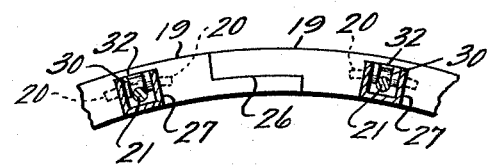
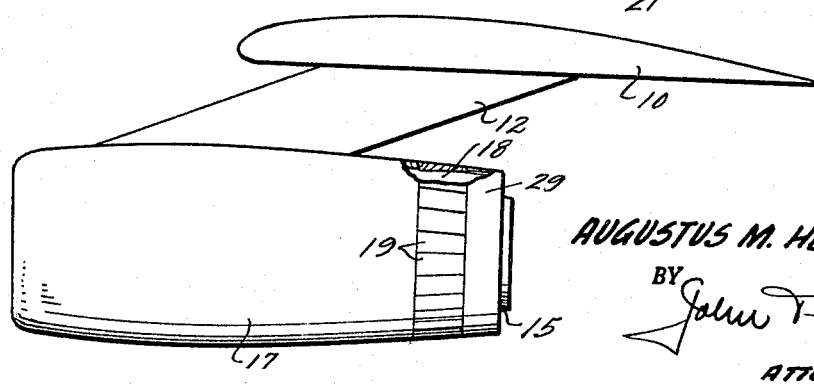
INVENTOR.
AUGUSTUS M. HELMINTOLLER
BY John F. Cullen
ATTORNEY 3,279,182
THRUST REVERSER
Augustus M. Helmintoller, Loveland, Ohio, assignor to General Electric Company, a corporation of New York
Filed June 7, 1965, Ser. No. 462,792
11 Claims. (Cl. 60—226)

The present invention, a continuation-in-part of application Serial No. 391,620, filed August 24, 1964, now abandoned relates to a thrust reverser mechanism and, more particularly, to a thrust reverser mechanism that is particularly applicable to by-pass type fan engines.

With the advent of the fan engine, whether forward or aft fan, it has become necessary to supply reverser mechanism to reverse the fluid flow through the generally annular cross section of the by-pass duct. Because the use of fans with conventional jet engines results in larger diameter engines, it is desired to provide reverser mechanism that does not add appreciably to an already large diameter when in the reversing position. Furthermore, because the engines become large and the reversing operation must be carried out on a relatively large periphery, it becomes important that the reversing structure be lightweight and straightforward and simple in operation. Such reversers generally employ translating or sliding structure such as doors, cams and complex linkages in order to open the reverser and to slide flaps or doors into position for thrust reversal and then move the same structure out of position during cruise operation. It is preferable, if possible, to use the structure that is already present in the engine and make it operate as a reverser as well as part of the normal engine structure during cruise operation.

The primary object of the present invention is to provide thrust reverser mechanism that has essentially only two moving parts consisting of a hinged flap and rotating actuator.

A further object is to provide a thrust reverser in which the flap structure is essentially the whole reverser mechanism and serves as dual flow surfaces in the cruise position as well as one of the flow surfaces in the reversed position.

Another object is to provide such a mechanism which employs no translating or sliding elements and is applicable to both front and aft fans.

Briefly stated, the invention is directed to use in a jet propulsion powerplant of the fan type which employs an inner jet engine enclosed within a wall and has a fan concentric with the engine and extending radially beyond the wall. Thrust reverser mechanism is provided which comprises a partitioned cowling to form openings, the cowling substantially surrounding the fan and spaced from the engine wall to form a by-pass duct. The end of the cowling includes a plurality of axially extending peripherally spaced sectioned segments with one section forming the inner surface at the downstream end of the cowling and the other section forming inner and outer flow surfaces of cowling and blocking the opening. Hinge means are provided for supporting the segments within their axial length to the cowling. Additionally, means are provided to pivot the segments about their hinge means to rotate the downstream section ends into the duct to abut the jet engine wall and the upstream section to unblock the opening to reverse the fluid flow in the duct. Alternately, rotation may be made only partially into the duct to modulate the thrust reversal. Further, the hinged segments forming the inner surface at the downstream end of the cowling may form a nozzle with the jet engine wall.

While the specification concludes with claims particularly pointing out and distinctly claiming the subject matter which is regarded as the invention, it is believed the invention will be better understood from the following description taken in connection with the accompanying drawings in which:

FIG. 1 is a partial cross-sectional view of a typical front fan powerplant supported from an aircraft wing and employing the instant invention;

FIG. 2 is an enlarged partial cross-sectional view illustrating the invention with the cowl flaps in the reverse thrust position shown in solid lines and the cruise position shown in dotted lines;

FIG. 3 is a partial perspective view of the cowl structure showing the supports with the flaps removed;

FIG. 4 is a view similar to FIG. 3 illustrating the flaps in the reverse thrust position and one of the actuators as well as the path of the reverse air flow;

FIG. 5 is an end view of a typical flap and actuator and support structure illustrating the extended and stowed positions and location of the actuators; and FIG. 6 is a view similar to FIG. 1 illustrating the invention as applied to an aft fan engine.

Referring first to FIG. 1, there is shown a front fan powerplant of the general type that might employ the instant invention. To this end, an aircraft structure such as wing 10 may support an engine generally indicated at 11 by means of conventional pylon structure 12. Engine 11 may be of the front fan type as shown in FIG. 1 and which employs an inner jet engine 13 discharging through a nozzle 14 to provide thrust. The jet engine is enclosed within a wall 15 in the conventional manner. In order to provide additional thrust in the well-known manner, a fan 16 concentric with the engine and extending radially beyond the wall 15 is provided. The fan 16 is surrounded by cowling 17 which is larger in diameter than the engine and is spaced from the engine wall 15 to form a by-pass duct 18 for additional thrust by movement of relatively large masses of lower velocity air in the well-known manner. As shown, the fan air is used to propel fluid through the duct 18 as well as to supercharge the engine 13.

In order to provide a simplified and lightweight reverser for the fan structure, it is advantageous to make direct use of a cowling 17 with a forward and aft portion forming an opening therebetween as part of the reverser mechanism. To this end, the aft portion of the cowling includes a plurality of axially extending and peripherally spaced segments 19 as shown in FIG. 2. Because it is desired to maintain the structure as light as possible and to use the structure that is normally present, the segments 19 are sectioned into an upstream and a downstream section with the downstream section forming the inner flow surface and the upstream section forming inner and outer continuous, smooth flow surfaces with the cowling 17 and blocking the opening as shown in FIG. 2. By thus locating the segments 19 it is possible to avoid any translating and camming structure as well as to provide a dual function for segments 19 as will be apparent hereinafter. Rotation to the solid line will thrust reverse the fan stream as shown in FIG. 2 and this is obtained by pivoting the segments at 20 so that they may be turned under the bias of actuators 21 to the solid thrust reversal position with the forward section of each segment thus unblocking the opening as shown. Alternately, they may be rotated into the dotted cruise position shown in FIG. 2. It will be apparent that this simple lightweight mechanism using a section of the segments to form the inner surface at the aft portion of the cowling structure permits the outer and inner surfaces of the forward section of the segments to act as flow surfaces of the cowling itself in the cruise position and block the opening in the cowling. In the reverse thrust position, the same inner surface 22 of the aft segment section acts as a reverse flow surface with the surface 23 of the cowling. Thus, the segments perform the dual function of being the reversing mechanism as well as the cowling structure and do it with a simple pivoting or rotating movement by means of actuators 21.

In order to balance the forces on the segments, it will be apparent that pivots 20, supporting the segments to the cowling, are preferably located within the axial length of the segments or between the ends of the sections and, may be conveniently located substantially midway of the axial length as is shown in FIG. 2. The midway location provides for generally balanced forces and easier operation and lower actuation forces. It will also be apparent that modulated thrust may be obtained by the amount of rotation of segments 19. If the segments are rotated so that the downstream end abuts the wall 15 as shown solid in FIG. 2, the entire fan stream is reversed. Rotation to some lesser degree will result in a modulated reverse thrust of the fan stream as will be obvious.

For purpose of maximum thrust from the by-pass stream, it is possible to make the inner surface of the aft section of segments 19 and wall 15 form a nozzle 24 and, depending on design, it may be advantageous to have the actual nozzle throat formed between the wall 15 and the aft end of the downstream section of segments 19 as shown at 25 in FIG. 2. Alternately, the throat may be formed elsewhere within the by-pass duct upstream in nozzle 24 as the design dictates. As shown in FIGS. 1 and 2, a nozzle may be formed in a front fan installation when the engine wall 15 extends downstream of the cowling 17 of which segments 19 form a part.

As described, this is the invention. It will be apparent that making part of the downstream end of the cowling into rotating flaps has the advantages of using a common structure for both reversal and cruise and, at the same time, of requiring only a simple actuator 21 to operate the segments to obtain any degree of reverse thrust. The dual use of the segments 19 permits the inner flow surface 22 to be used as a flow surface both in the dotted cruise position or in the solid reverse thrust position.

While a specific actuator 21 has been shown, it will be obvious that other suitable means may be employed to rotate segments 19 such as a conventional motor and worm gear arrangement acting directly on pivot 20. However, for simplicity, it is preferred to employ actuators 21 which will now be described in more detail.

It will be apparent from FIG. 2, that rotation of segments 19 about a complete or partial engine periphery depending on the axial location of pylon 12, results in the inner ends of the segments rotating inwardly and thus the segment inner ends approach one another whereas the outer ends of the segments tend to separate. In this sense the term "segments" is intended to cover any suitable arrangement that encompasses this simple actuating structure and it will generally result in a somewhat pie-shaped segment as shown in FIG. 4. As the segments rotate at their outer periphery and tend to separate, it will be apparent that some means must be provided for sealing in order that all the fluid will be reversed. By the same token the inner or downstream ends of the segments must be able to nest or slide over one another in order to accommodate their relative motion towards one another. This is easily accomplished by providing suitable stepped or overlapping segments as illustrated at 26 in FIG. 4. Such an arrangement, which may be carried out with identical segments or, as shown, may make alternate segments alike, permits the segments to slide across one another during operation and still maintain a closed surface for the fluid at all times.

A typical structure that permits hinging the segments and housing the actuators efficiently is shown in FIGS. 3–5. The portioned cowling structure 17, as shown in FIG. 3 with the segments removed, has a plurality of substantially axially-extending and peripherally spaced supports 27 which are conveniently in the form of a U-shaped channel opening outwardly as shown in FIG. 3. These supports extend in the downstream direction as shown by arrow 28 to define the openings and are fixed to and form an extension of the cowling 17. In order to provide a mounting structure for the segments 19, a ring member 29 is fixed to the supports as the downstream end as shown in FIGS. 3–5. Note that the ring is a fixed member and does not move in any direction. This ring forms the support member for the segments and, to this end, the pivot means 20 are provided on fixed ring 29 or as shown in FIG. 5, may be provided on each side of the support 27 so that segment 19 straddles the support. The actuation force for the segments 19 is provided by actuators 21 which are pivoted to the segments at 30 and within the cowling at 31 respectively, as shown 1 FIG. 2. It is preferable to connect the actuators 21 approximately centrally of the segments at 30 in the section upstream of the pivot 20 so that maximum force may be applied to the segment when the segments are pivoted substantially midway of their axial length as shown in FIG. 2. This provides for the best balancing and minimum actuating forces. It will be seen from FIGS. 4 and 5 that mounting the actuators 21 as described, permits them to rotate into channel 27 and nest in the channel and in the cowling when the segments are rotated out of the duct to form the inner surface at the downstream end of the cowling and to rotate the upstream section of the segments out into the air stream for reversal when the actuators are moved out of the channel supports 27. While the channel supports 27 are substantially axially-extending as shown in FIG. 3, they may radiate out slightly in order to take advantage of the contour of cowling 17 as shown in FIG. 2. In other words, in order to maintain the by-pass duct 18 unimpeded in the cruise position, the actuators will rest within the cowling 17 while the actuator rods lie within the channel supports 27, the supports in turn lie within suitable recess 32 in the segments 19. In this way the inner flow surface is preserved and the actuators are conveniently folded out of the way within the cowling requiring a very narrow thickness of cowling.

Reference to FIG. 6 indicates that the same structure may be applied to an aft fan engine or even a front fan engine if it is desired to carry the cowling all the way back to the rear of the engine wall 15. The same structure is employed in the FIG. 6 arrangement and performs the same function.

It will be apparent that the reverser of the instant invention employs no cascades and no translating or sliding mechanism and no complex linkage systems. Simple actuators and hinged flaps alone accomplish the thrust reversal—both complete and modulated. The invention makes use of existing fan nozzle structure for the thrust reversal and the only additional parts required are the pivot structure and actuating mechanisms neither of which are translating or complex. The only motion, except that of the actuator, is simple rotation of the hinged segments to provide any degree of reversal and the use of the same structure for cruise and reverse thrust.

While there have been shown preferred forms of the invention, obvious modifications and variations are possible in light of the above teachings. It is therefore to be understood that within the scope of the appended claims, the invention may be practiced otherwise than as specifically described.

I claim:
1. In a jet propulsion powerplant of the fan type having an inner jet engine enclosed within a wall and a fan concentric therewith and extending radially beyond said wall, thrust reverser mechanism comprising,
    a cowling surrounding said fan and spaced from said engine wall to form a by-pass duct, said cowling having forward and aft portions forming an opening therebetween,
    a plurality of axially-extending and peripherally spaced segments having upstream and downstream sections, said upstream section forming inner and outer cowling continuous smooth flow surfaces and blocking said opening, said downstream section forming the inner flow surface at the aft portion of said cowling, hinge means supporting said segments between the sections to said cowling, and means for pivoting said segments about said hinge means for rotating the downstream section into said duct and the upstream section for unblocking said opening for reversing fluid flow in the duct out through said opening.

2. Apparatus as described in claim 1 wherein the section forming the inner flow surface at the aft portion of said cowling and the jet engine wall form a nozzle.

3. Apparatus as described in claim 2 wherein the downstream section of said segments and the jet engine wall form the throat of a propulsion nozzle.

4. Apparatus as described in claim 2 wherein said segments are hinged substantially midway of their axial length and are rotated into the by-pass duct so the segments downstream end abut said wall.

5. Apparatus as described in claim 2 wherein the fan is a front fan and the engine wall extends downstream of said cowling.

6. In a jet propulsion powerplant of the fan type having an inner jet engine enclosed within a wall and a fan concentric therewith and extending radially beyond said wall, thrust reverser mechanism comprising, a cowling surrounding said fan and spaced from said engine wall to form a by-pass duct, said cowling having forward and aft portions forming an opening therebetween, a plurality of peripherally spaced supports connecting said portions, a ring member fixed to said supports at the downstream end thereof, a plurality of axially-extending and peripherally spaced segments having upstream and downstream sections and pivotally attached to said ring, each segment straddling a support and said upstream section forming inner and outer cowling continuous smooth flow surfaces, and actuating means within said cowling connected to said segments for rotating the downstream section of said segments into said duct and the upstream section for unblocking said opening for reversing the fluid flow in the duct out through said opening.

7. Apparatus as described in claim 6 wherein said supports are U-shaped channels and said actuators are connected to said segments substantially centrally thereof and upstream of said pivotal attachment to nest within said channel when said segments are rotated out of said duct to form the inner flow surface at the aft portion of said cowling.

8. Apparatus as described in claim 6 wherein the segments forming the downstream section and the jet engine wall form a nozzle.

9. Apparatus as described in claim 8 wherein the segments forming the aft end of the downstream section and the jet engine wall form the throat of a propulsion nozzle.

10. Apparatus as described in claim 8 wherein said segments are pivotally attached to said ring substantially midway of their axial length and are rotated into the by-pass duct so the downstream sections abut said wall.

11. Apparatus as described in claim 8 wherein the fan is a front fan and the engine wall extends downstream of said cowling.

References Cited by the Examiner

UNITED STATES PATENTS

| | | | |
|---|---|---|---|
| 2,396,911 | 3/1946 | Anxionnaz et al. | 60—35.6 |
| 2,847,823 | 7/1958 | Brewer | 60—35.54 |
| 3,036,431 | 5/1962 | Vdolek | 60—35.54 |
| 3,068,646 | 12/1962 | Fletcher | 60—35.54 |
| 3,113,428 | 12/1963 | Colley et al. | 60—35.54 |
| 3,172,256 | 3/1965 | Kerry et al. | 60—35.54 |

FOREIGN PATENTS 955,518    4/1964    Great Britain.

MARK NEWMAN, *Primary Examiner.*

C. R. CROYLE, *Assistant Examiner.*